April 8, 1958  A. VAN WINGERDEN ET AL  2,829,468
APPARATUS TO FORM SOIL PACKS FOR PLANTING
Filed July 12, 1954  3 Sheets-Sheet 1

INVENTORS
AART VAN WINGERDEN
JOHANNAS C. DEN HOLLANDER
BY
Robert F. Beck
ATTORNEY April 8, 1958   A. VAN WINGERDEN ET AL   2,829,468
APPARATUS TO FORM SOIL PACKS FOR PLANTING
Filed July 12, 1954   3 Sheets-Sheet 2
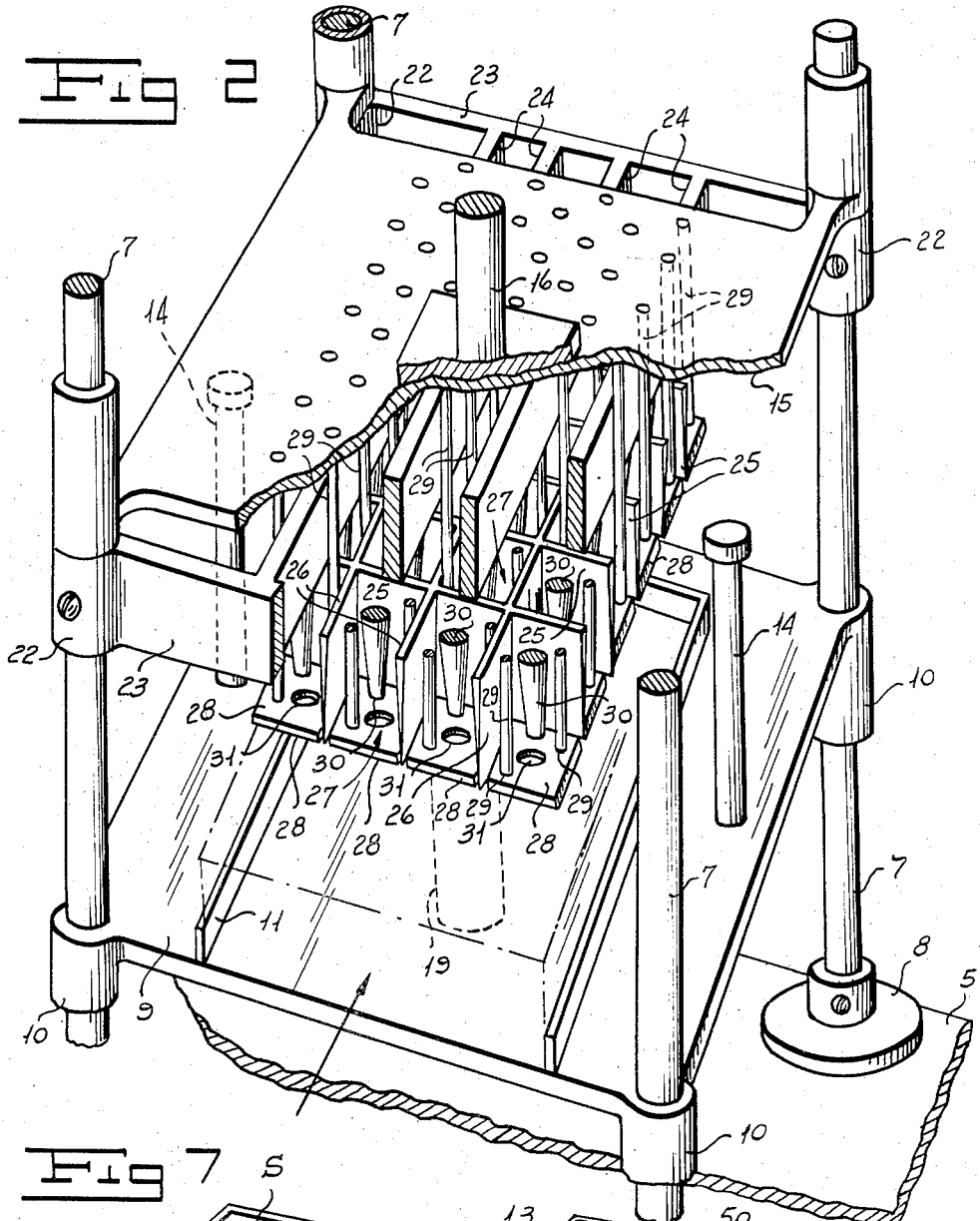
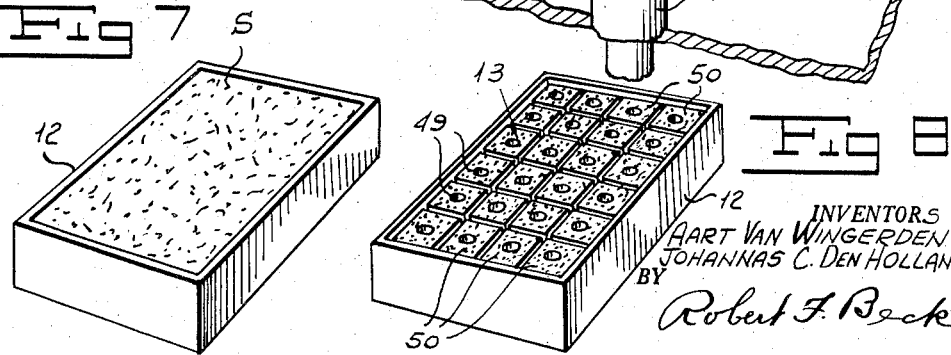
INVENTORS
AART VAN WINGERDEN
JOHANNAS C. DEN HOLLANDER
BY Robert F. Beck
ATTORNEY

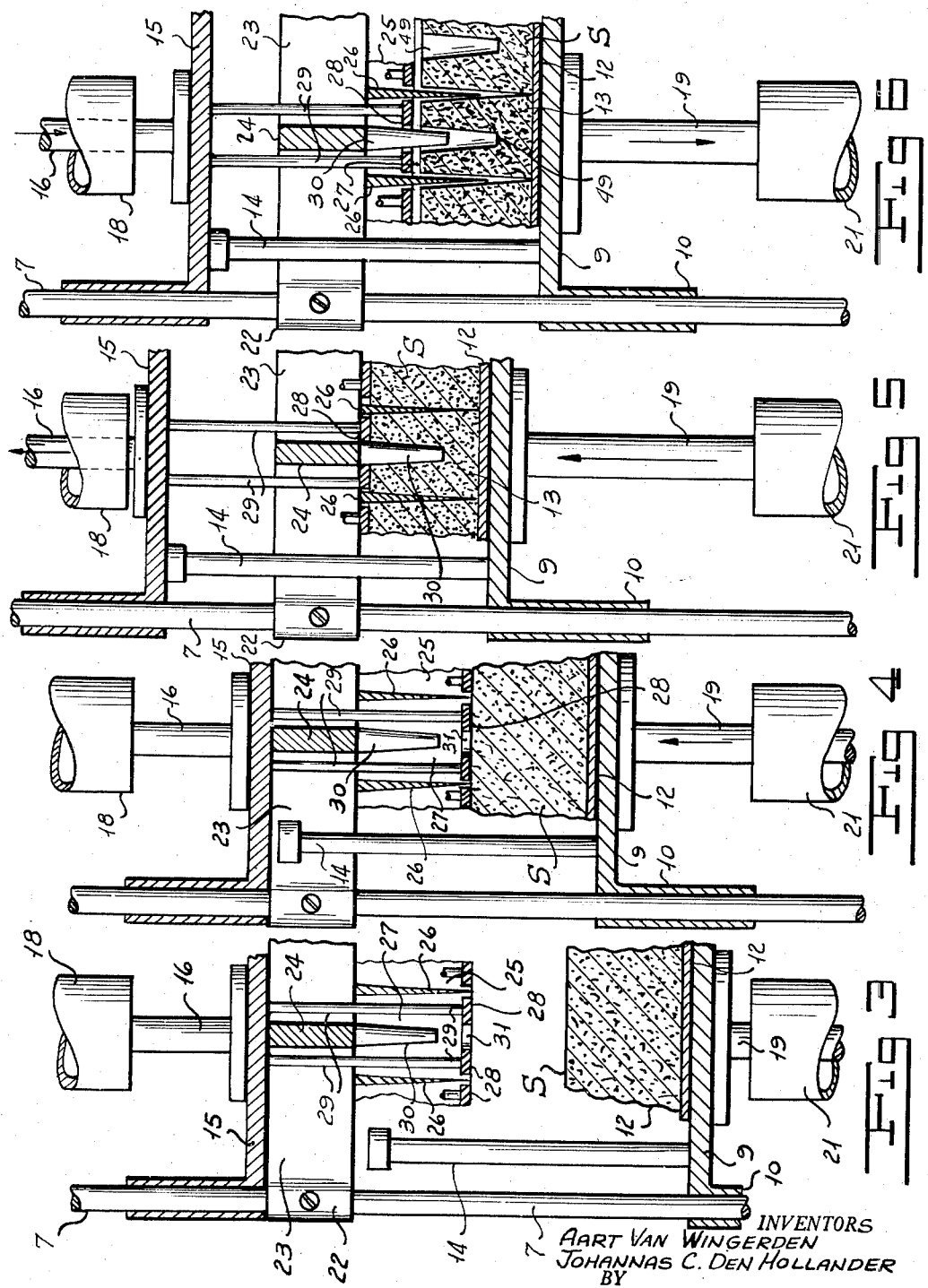

United States Patent Office 2,829,468
Patented Apr. 8, 1958

2,829,468

APPARATUS TO FORM SOIL PACKS FOR PLANTING

Aart van Wingerden, Pompton Plains, and Johannas C. den Hollander, Wayne Township, Passaic County, N. J.

Application July 12, 1954, Serial No. 442,578

3 Claims. (Cl. 47—1)

Our invention relates to plants and farm products and more particularly to a means for forming soil packs to promote the early growth of the plants.

One of the objects of our invention is to provide means and a method for aiding the preliminary growth of the plants in relatively small weather controlled areas and in a manner contributing to and maintaining the hearty and flourishing growths of the plants when transferred to relatively large outdoor areas for their increasing and final growths.

Another object of our invention is to provide apparatus for forming the soil into a pack in such a manner that plants initially grown therein may be readily transferred with the soil to desired localities.

A further object of our invention is to provide a soil pack constructed of readily separable sections constituting units in which plants are grown for subsequent planting within the unit and in greater spatiality.

A still further object of our invention is to provide a method of forming a unitized soil pack for growing plants in the units thereof and in a manner permitting compact storage of packs and easy treatment of the soil and plants comprising the units previous to outdoor planting of the units.

An important object of our invention is to provide a soil pack of the foregoing described character wherein the soil is sufficiently compressed within the units to preclude disintegration of the units upon transfer of the units for planting in other localities and without molecular break down of the soil structure.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 2 is a fragmentary perspective view of the apparatus.

Figures 3, 4, 5 and 6 are detail vertical sectional views of portions of the apparatus illustrating the steps in the forming of a soil pack.

Figure 7 is a perspective view of a loaded flat or tray before the forming of a soil pack therein.

Figure 8 is a perspective view of a flat or tray with a soil pack formed therein and illustrating units in which plants are initially grown.

Figure 1:
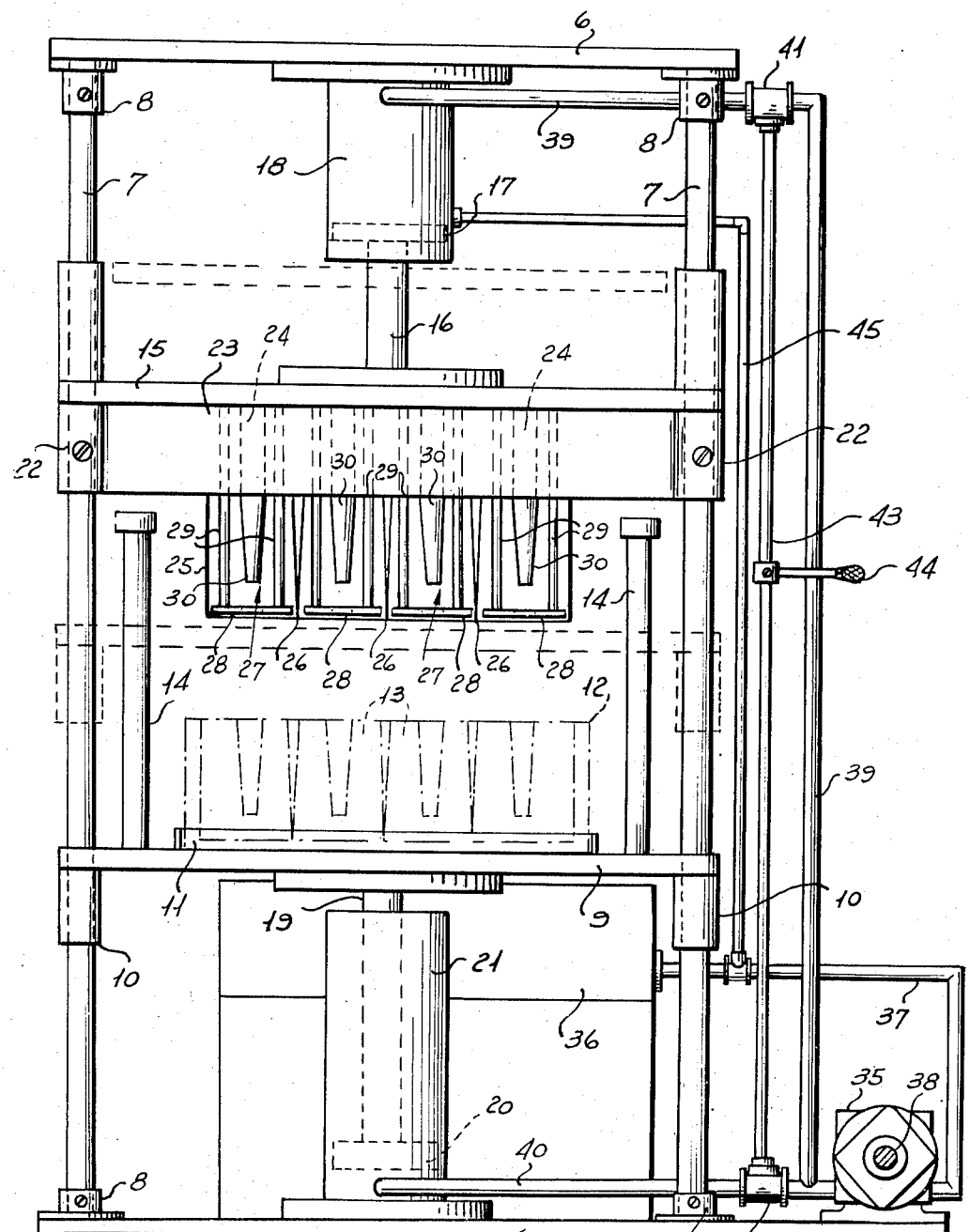
Figure 1 is a side elevation of our apparatus for forming the soil packs.

As illustrated in the drawings, our apparatus for forming our novel soil packs comprises a base 5 and a top 6 connected in spaced relation by means of standards constituting rods 7. Collars 8 are sleeved about the ends of the rods 7 and connect the latter in fixed relation to the base 5 and the corners of the top 6. A platform 9 is equipped at its corners with sleeves 10 slidably receiving the rods 7. A guide frame 11 is secured to the platform 9 and accommodates therein a tray or flat 12 in which is formed the soil pack 13 as hereinafter more fully described.

The platform 9 is provided with elevating posts 14 extending upwardly therefrom for engaging and operating an ejector plate 15 of a die assembly, the plate 15 being equipped with sleeves slidable on the rods 7. The ejector plate 15 is fixed to the outer end of a piston rod 16 of a piston 17 reciprocally mounted within a cylinder 18 fixed to the top 6 between the latter and the plate 15 while the platform 9 is similarly connected to the outer end of a piston rod 19 of a piston 20 reciprocally mounted within a cylinder 21 fixed to the base 5 interjacent the latter and the platform 9.

Between the platform 9 and the plate 15, the die assembly is provided with sleeves 22 receiving and fixed to the rods 7 and connected together in paired relation by a pair of spaced coextending truss members 23. Connected to and extending between the truss members 23 are a plurality of spaced parallel truss bars 24 fixed to the upper faces of parallel spaced vertically disposed walls 25 of a cellular die having right-angularly extending similar walls 26 bisecting the walls 25 and coacting therewith to define a plurality of cells 27. The walls 25 and 26 are cuneiform to provide tapering sides and relatively sharp lower faces to facilitate removal of soil S from the cells as hereinafter more fully disclosed.

Mounted within each of the cells for vertical movement therein relative to the walls 25 and 26 is a soil compression plate or member 28 connected to the plate 15 by rods 29 for unitary movement with the plate 15. The truss bars 24 extend over and centrally of the cells 27 and are provided with frustum-shaped dowels or pins 30 extending an appreciable distance within the cells, respectively, and which pins 30 operate through openings 31 formed in the members 28.

A pump 35 is mounted on the base 5 and is connected to an oil supply reservoir 36 by means of a pipe 37, the drive shaft 38 of the pump being connected to a suitable source of power, for instance, an electric motor or tractor. The discharge port of the pump is connected by means of supply pipes 39 and 40 to the upper and lower ends of the cylinders 18 and 21 for lowering and raising the pistons 17 and 20, respectively, therein.

The pipes 39 and 40 are provided with valves 41 and 42 for controlling the fluid to the cylinders 18 and 21, respectively, from the pump 35 and which valves 41 and 42 are operated by means of a stem 43 provided with a handle 44, the lower end of the cylinder 18 being connected to the pipe 37 by a by-pass pipe 45. When the piston 20 is operated upwardly within the cylinder 21 by the action of the pump, the piston 17 within the cylinder 18 is free to move upwardly therein when the valve 42 is open and the valve 41 is closed with respect to communication with the pump. Similarly, when the piston 17 is operated downwardly within the cylinder 18 by the action of the pump, the piston 20 is free to move downwardly within the cylinder 21 when the valve 41 is opened and the valve 42 is closed, it being understood that when the pump is rendered ineffective with respect to the pistons, the latter will gravitate and assume their lower positions.

In use, the pump 35 is running and the pistons 17 and 20 in their lower positions, a tray or flat 12, filled with soil S, is placed upon the platform 9 within the guide frame 11, as depicted in Figure 3, and the valve 42 opened to effect raising of the platform 9 by the piston 20. As the platform 9 raises, the soil within the tray engages the compressing plates 28 and lower faces of the walls 25 and 26, as illustrated in Figure 4, whereupon the walls 25 and 26 penetrate the soil while the posts 14 engage the ejector plate 15 and raise the latter and the compressing plates 28 by means of the rods 29, as shown in Figure 5, it being noted that as the compressing plates 28 are raised, the pins 30 project through the openings 31 and into the soil S to form sockets or cul-de-sacs 49 therein with the wall. At this point in the operation, the valves 42 and 41 are closed and opened, respectively, whereupon the plate 15 descends by reason of the downward movement of the piston 17 and thus effects compression of the soil S within the cells 27 through the instrumentality of the compression plates 28 and coincident descending of the platform 9, as pictured in Figure 6. Continuous downward movement of the platform 9 to its lower position effects withdrawal of the walls 26 and 25 and the pins 30 from within the soil S with the result that the soil S contained within the flat or tray 12 is compressed into a plurality of soil or plant units 50. The plates 28 not only cooperate with the walls 25 and 26 to compress the soil within the cells but also function to remove soil from the walls 25 and 26 and the pins 30 upon their withdrawal from the tray thus preserving the unitary structure and form of the sections or units 50, it being understood that the compressing of the soil by the plates, in order to form the units, is not sufficient to destroy or break down the molecular structure of the soil or to preclude or retard root penetration and growth therein. The length of the posts 14 are such as to permit a desired compressing of the soil by the plates 28 before the posts engage the ejector plate 15 and raise the plates 28 within the cells 27.

When the walls 25 and 26 and the pins 30 are thus withdrawn, the units will be separated by channels formed by the walls 25 and 26 and each unit provided with a socket 49 due to the action of a pin 30 as heretofore disclosed. The units thus formed constitute a soil pack which is removed from the platform within the tray or flat and maintained therein until such time as it is desired to transfer the units to another location, it being understood that seeds or the like are planted within the sockets 49 and covered therein by soil for growth into plants and subsequent transfer and planting with the units after the initial growth of the plants. The term "seeds" as used herein shall be construed to include spores, bulbs, in embryo and preliminary growth therefrom as well as from cuttings or slips and of young plants.

The soil forming the pack may be pretreated to contribute to the growth of the plants or the soil of the units treated during initial growth of the plants. Furthermore, it is conceivable that mechanism may be designed and employed for presenting the soil to the die assembly and removing the packs therefrom to effect automatic forming of the units and that other suitable mechanism may be developed and utilized for planting the units. Obviously, from the foregoing, it will be apparent that our novel form of soil pack materially contributes to the initial growth of plants in a manner to facilitate and economize preseasonal growth thereof for subsequent outdoor and field planting.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What we claim is:

1. In an apparatus for forming soil packs, a platform adapted to accommodate a tray or the like containing soil, a die assembly having a frame provided with spaced intersecting walls coacting together to define cells between said walls for receiving soil therein upon penetration of the soil contained within said tray by said walls, said assembly including a member movable relative to said frame and equipped with soil compressing plates operable into and out of said cells for compressing soil therein during said penetration, said frame being provided with pins extending within said cells, respectively, for forming sockets in the soil within said cells during said compressing, said platform being movable relative to said assembly to effect said penetration of said walls within said soil to provide a soil pack within said tray having a plurality of spaced soil units for the planting and growing of plants therein and mounting means operatively connecting said assembly and platform together.

2. In an apparatus for forming soil packs, a platform adapted to accommodate a tray or the like containing soil, a die assembly having a frame provided with spaced intersecting walls coacting together to define cells between said walls for receiving soil therein upon penetration of the soil contained within said tray by said walls, said assembly including a member movable relative to said frame and equipped with soil compressing plates operable into and out of said cells for compressing soil therein during said penetration, said frame being provided with pins extending within said cells, respectively, for forming sockets in the soil within said cells during said compressing, said platform being movable relative to said assembly to effect said penetration of said walls within said soil to provide a soil pack within said tray having a plurality of spaced soil units for the planting and growing of plants therein, said platform having posts for engaging said member upon penetration of said walls to limit the action of said plates, and mounting means operatively connecting said assembly and said platform together.

3. In an apparatus for forming soil packs, a platform adapted to accommodate a tray or the like containing soil, a die assembly having a frame provided with spaced intersecting walls coacting together to define cells between said walls for receiving soil therein upon penetration of the soil contained within said tray by said walls, said assembly including a member movable relative to said frame and equipped with soil compressing plates operable into and out of said cells for compressing soil therein during said penetration, said frame being provided with pins extending within said cells, respectively, for forming sockets in the soil within said cells during said compressing, said platform being movable relative to said assembly to effect said penetration of said walls within said soil to provide a soil pack within said tray having a plurality of spaced soil units for the planting and growing of plants therein, said platform having posts for engaging said member upon penetration of said walls to limit the action of said plates, mounting means operatively connecting said assembly and platform together, and selectively operated power means connected to said assembly and said platform for effecting their respective operations.

References Cited in the file of this patent

UNITED STATES PATENTS

| | | |
|---|---|---|
| 523,991 | Oliver | Aug. 7, 1894 |
| 1,887,796 | Boere | Nov. 15, 1932 |
| 2,036,416 | Krueger | Apr. 7, 1936 |

(Other references on following page)

FOREIGN PATENTS

| | | |
|---|---|---|
| 341,819 | Great Britain | Jan. 22, 1931 |
| 636,001 | Great Britain | Apr. 19, 1950 |
| 661,322 | Great Britain | Nov. 21, 1951 |
| 183,928 | Switzerland | July 16, 1936 |

OTHER REFERENCES

Hamburger Garten- und Blumenzeitung, vol. 27, No. 2, pages 93 and 94, published 1871 at Hamburg, Germany; article "Neues und originelles Ersatzmittel für Blumentöpfe."